United States Patent
Kigoshi et al.

(10) Patent No.: US 11,148,810 B2
(45) Date of Patent: Oct. 19, 2021

(54) AIRCRAFT SEAT UNIT, AND AIRCRAFT SEAT UNIT ASSEMBLY

(71) Applicant: JAMCO CORPORATION, Tokyo (JP)

(72) Inventors: Rei Kigoshi, Evanston, IL (US); Tsuyoshi Oguri, Tokyo (JP); Yuu Uchida, Kanagawa (JP); Tatsuro Kimura, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 4 days.

(21) Appl. No.: 16/760,555

(22) PCT Filed: Nov. 6, 2018

(86) PCT No.: PCT/JP2018/041128
§ 371 (c)(1),
(2) Date: Apr. 30, 2020

(87) PCT Pub. No.: WO2019/088297
PCT Pub. Date: May 9, 2019

(65) Prior Publication Data
US 2021/0214088 A1    Jul. 15, 2021

(30) Foreign Application Priority Data
Nov. 6, 2017 (JP) .............................. JP2017-214217

(51) Int. Cl.
*B64D 11/06* (2006.01)
(52) U.S. Cl.
CPC ................................ *B64D 11/0639* (2014.12)
(58) Field of Classification Search
CPC .............................................. B64D 11/0639
See application file for complete search history.

(56) References Cited

U.S. PATENT DOCUMENTS 6,170,786 B1    1/2001   Park
7,093,904 B1 *  8/2006   McMillen .............. A47C 7/543
                                                  297/411.37
(Continued)

FOREIGN PATENT DOCUMENTS

EP    2272711 A1    1/2011
JP    S56-105448 U  8/1981
(Continued)

OTHER PUBLICATIONS

International Search Report dated Jan. 29, 2019, issued in counterpart International Application No. PCT/JP2018/041128.
(Continued)

*Primary Examiner* — Philip F Gabler
(74) *Attorney, Agent, or Firm* — Renner, Otto, Boisselle & Sklar, LLP

(57) ABSTRACT

In order to provide an aircraft seat unit and an aircraft seat unit assembly capable of meeting various passenger requirements, an aircraft seat unit is provided with a seat portion including a first buttocks support layer and a second buttocks support layer, and a backrest portion. The seat portion is configured to be capable of changing states between a short seat portion state and a long seat portion state. The first buttocks support layer configured to support the buttocks of a passenger in the short seat portion state is harder than the second buttocks support layer configured to support the buttocks of the passenger in the long seat portion state.

15 Claims, 18 Drawing Sheets

(56) References Cited

U.S. PATENT DOCUMENTS

| | | | |
|---|---|---|---|
| 7,472,957 B2* | 1/2009 | Ferry | B60N 2/206 |
| | | | 297/343 |
| 8,011,723 B2* | 9/2011 | Park | B60N 2/345 |
| | | | 297/118 |
| 8,118,359 B2* | 2/2012 | Kyogoku | B60N 2/3038 |
| | | | 297/105 |
| 8,162,396 B2* | 4/2012 | Edwards | A47C 4/028 |
| | | | 297/233 |
| 8,998,138 B2* | 4/2015 | Ferry | B64D 11/0601 |
| | | | 244/118.6 |
| 9,359,079 B2* | 6/2016 | Scott | B64D 11/0693 |
| 9,487,298 B2* | 11/2016 | Quatmann | B60N 2/7005 |
| 10,933,999 B2* | 3/2021 | Blanck | B64D 11/0646 |
| 2009/0146004 A1 | 6/2009 | Plant | |
| 2012/0318918 A1 | 12/2012 | Johnson et al. | |
| 2013/0320724 A1 | 12/2013 | Plant | |
| 2014/0300147 A1 | 10/2014 | Suhre | |
| 2015/0274302 A1 | 10/2015 | Suhre | |

FOREIGN PATENT DOCUMENTS

| | | |
|---|---|---|
| JP | H02-290751 A | 11/1990 |
| JP | H09-254685 A | 9/1997 |
| JP | 2000-142589 A | 5/2000 |
| JP | 2011-506165 A | 3/2011 |
| JP | 2011-084274 A | 4/2011 |
| JP | 2016-521157 A | 7/2016 |

OTHER PUBLICATIONS

Written Opinion of the International Searching Authority dated Jan. 29, 2019, issued in counterpart International Application No. PCT/JP2018/041128.

* cited by examiner

AIRCRAFT SEAT UNIT, AND AIRCRAFT SEAT UNIT ASSEMBLY

TECHNICAL FIELD

The present invention relates to an aircraft seat unit and an aircraft seat unit assembly.

BACKGROUND OF THE INVENTION

Multiple seat units are arranged in the cabins of aircrafts. Each seat unit comprises a seat portion and a backrest portion.

As a related technique, Patent Document 1 describes a seat arrangement structure of an aircraft. In the seat arrangement structure of the aircraft described in Patent Document 1, each seat group includes a set of seats arranged in a state in which the seats of each seat group are parallel to the other seats, and each seat and seat pair are positioned at an offset angle with respect to the longitudinal axis of the cabin. In addition, each seat can be put in a completely flat state.

CITATION LIST

Patent Literature

[Patent Document 1] Japanese Patent Application Laid-Open No. 2011-506165

SUMMARY OF INVENTION

Technical Problem

The seat described in Patent Document 1 is configured to change forms between a seating form and a completely flat form. However, in both the seating form and the completely flat form, the hardness of the seat surface is the same, and support for the diverse requirements of passengers is insufficient.

Accordingly, it is an object of the present invention to provide an aircraft seat unit and an aircraft seat unit assembly capable of meeting the diverse requirements of passengers.

Solution to Problem

To achieve the above object, an aircraft seat unit according to the present invention comprises a seat portion including a first buttocks support layer and a second buttocks support layer; and a backrest portion, wherein the seat portion is configured to be capable of changing states between a short seat portion state and a long seat portion state, and the first buttocks support layer configured to support a buttocks of a passenger in the short seat portion state is harder than the second buttocks support layer configured to support a buttocks of a passenger in the long seat portion state.

Advantageous Effects of Invention

According to the present invention, it is possible to provide an aircraft seat unit and an aircraft seat unit assembly capable of meeting the diverse requirements of passengers.

DESCRIPTION OF EMBODIMENT(S)

Figure 1:
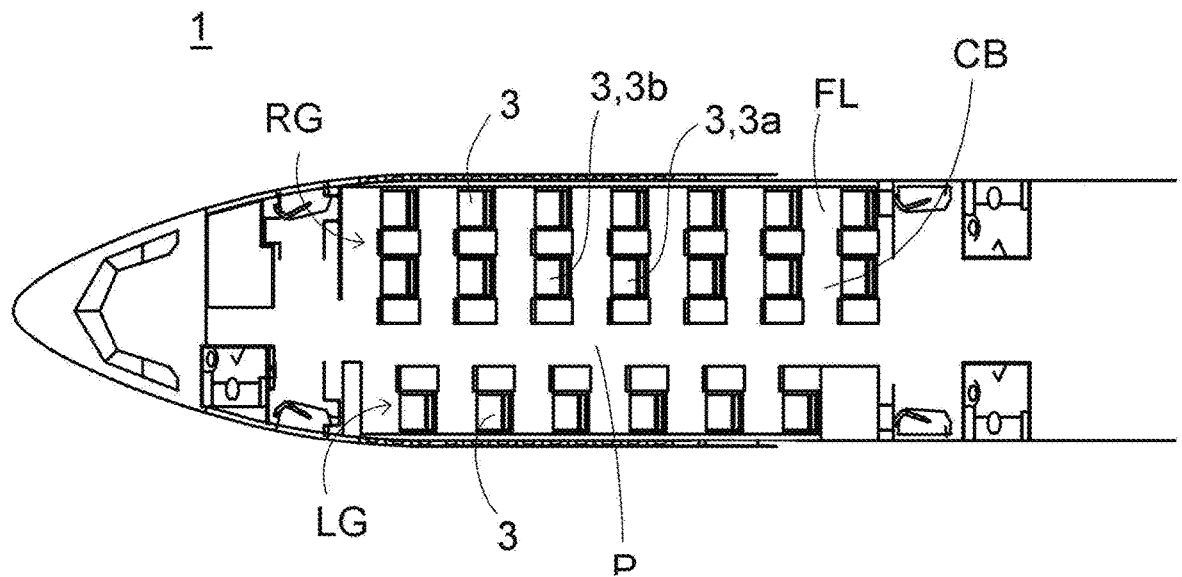
FIG. 1 is a notch plan view that schematically illustrates a portion of the aircraft.

Hereinafter, an aircraft seat unit 3 and an aircraft seat unit assembly 2 according to embodiments will be described with reference to the drawings. It should be noted that in the following description of embodiments, components and members having the same functions are denoted by the same reference numerals, and repetitive descriptions of components and members denoted by the same reference numerals will be omitted.

EMBODIMENTS

Figure 2:
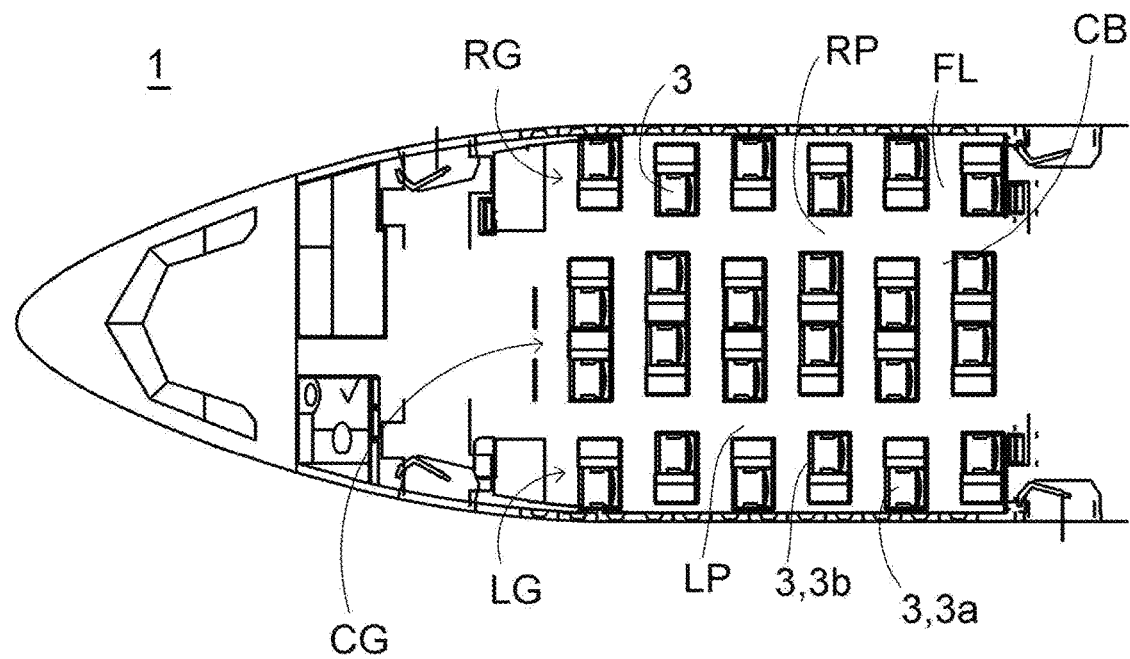
FIG. 2 is a notch plan view that schematically illustrates a portion of the aircraft.

An example of an arrangement of the seat units according to embodiments will be described with reference to FIG. 1 and FIG. 2. FIG. 1 and FIG. 2 are notch plan views that schematically illustrate portions of an aircraft 1.

As illustrated in FIG. 1, a plurality of seat units 3 including a first seat unit 3a and a second seat unit 3b are disposed in a cabin CB of an aircraft 1. In addition, an aircraft seat unit assembly is formed by the plurality of seat units 3. It should be noted that each seat unit 3 is attached to the floor FL of the cabin CB.

In the example illustrated in FIG. 1, a main aisle P is disposed along the longitudinal direction of the aircraft (the axis direction of the aircraft), a right seat unit group RG is disposed on the right side of the main aisle P (more particularly, the right side when viewed from the rear of the aircraft toward the front), and a left seat unit group LG is disposed on the left side of the main aisle P (more particularly, the left side when viewed from the rear of the aircraft toward the front).

In the example illustrated in FIG. 1, the right seat unit group RG includes a plurality of seat units arranged in two rows, and the left seat unit group LG includes a plurality of seat units arranged in one row. It should be noted that, in the example illustrated in FIG. 1, the main aisle P is one aisle disposed near the center in the width direction of the aircraft, but as illustrated in FIG. 2, the main aisle P may include a left main aisle LP and a right main aisle RP. In this case, the left seat unit group LG is disposed on the left side of the left main aisle LP, the right seat unit group RG is disposed on the right side of the right main aisle RP, and a central seat unit group CG is disposed between the left main aisle LP and the right main aisle RP.

In the example illustrated in FIG. 1 and FIG. 2, each seat unit group includes a plurality of seat units arranged in one row or two rows. Alternatively, the group of seat units may include a plurality of seat units arranged in three rows.

In addition, in the example illustrated in FIG. 1 and FIG. 2, all the seat units are arranged to face forward, but at least one seat unit may be arranged to face obliquely forward. Alternatively or additionally, at least one seat unit may be arranged to face backward or obliquely backwards.

First Embodiment

Figure 3:
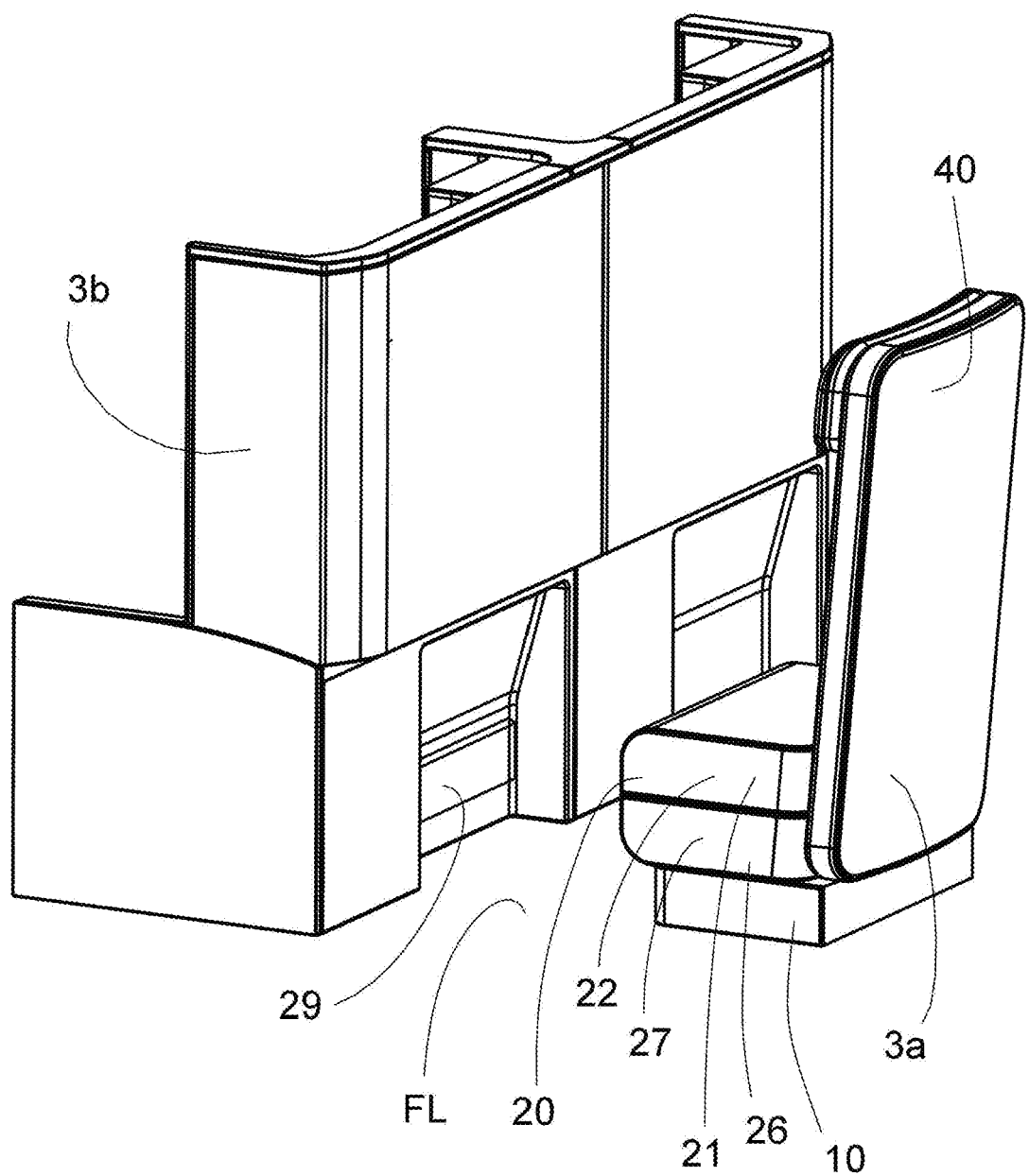
FIG. 3 is a schematic perspective view of a seat unit assembly including a first seat unit and a second seat unit. Note that FIG. 3 illustrates a state in which the seat portion is in a short seat portion state.
Figure 4:
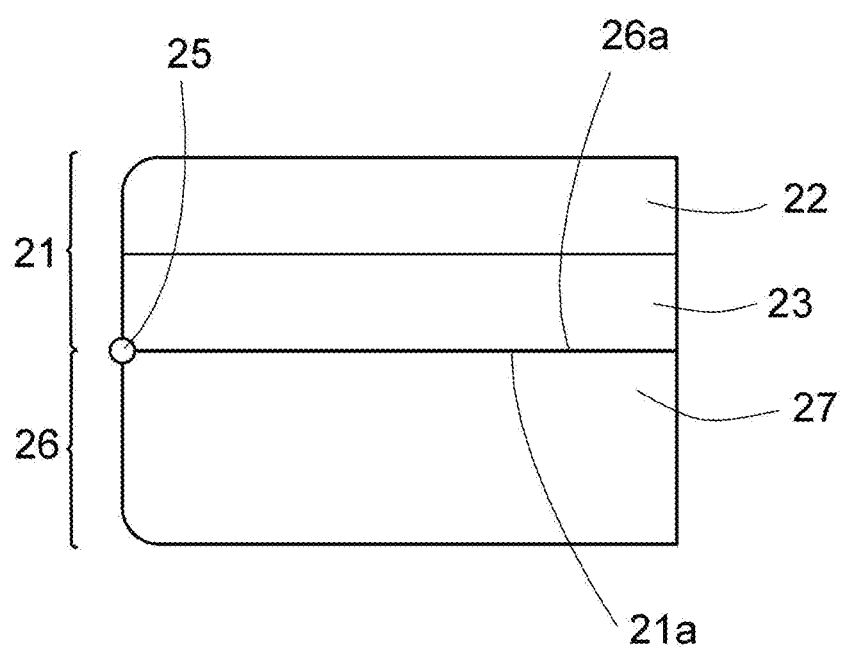
FIG. 4 is a schematic longitudinal sectional view that schematically illustrates a seat portion in the state of FIG. 3.
Figure 5:
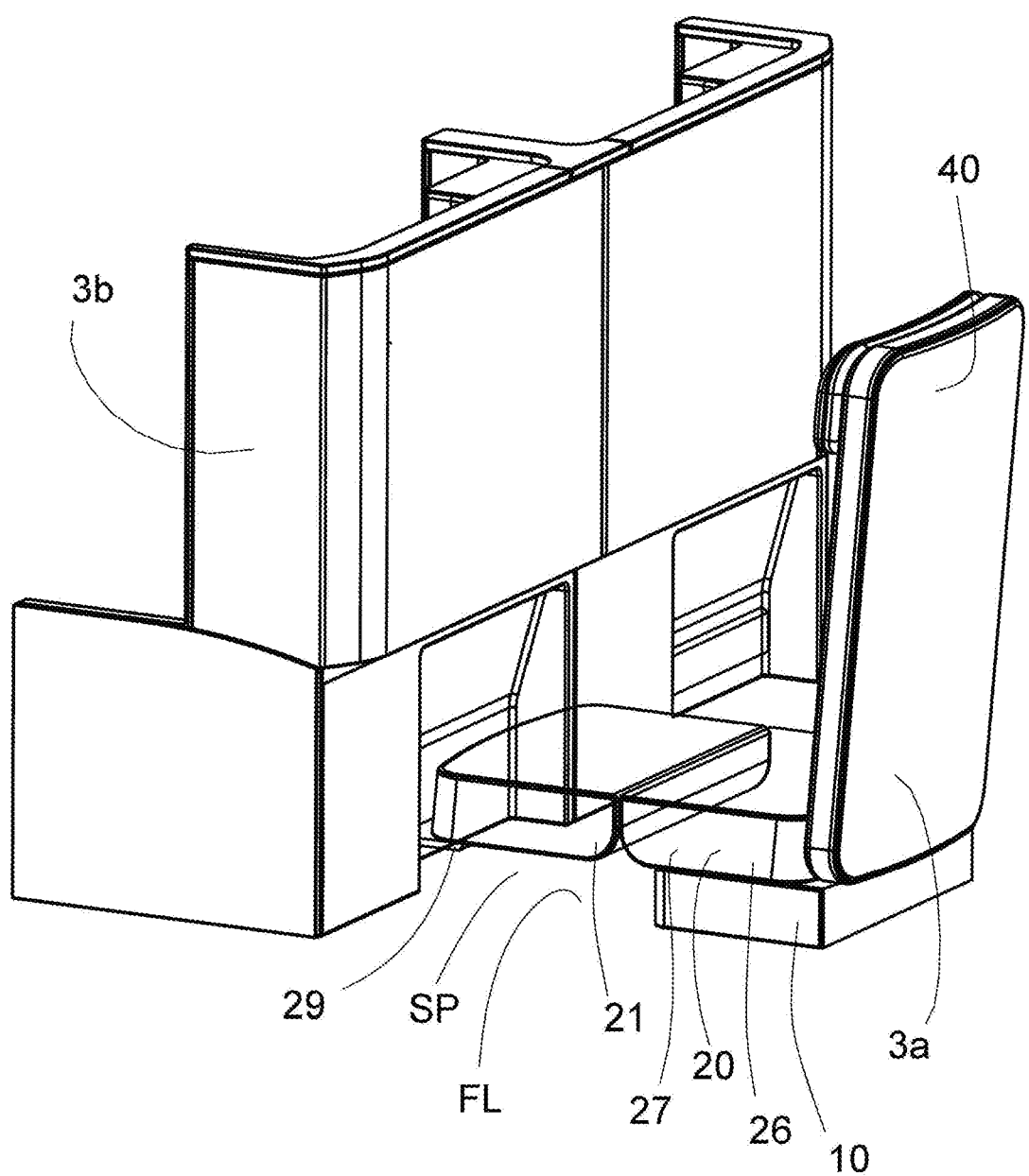
FIG. 5 is a schematic perspective view of a seat unit assembly including a first seat unit and a second seat unit. Note that FIG. 5 illustrates a state in which the seat portion is in a long seat portion state.
Figure 6:
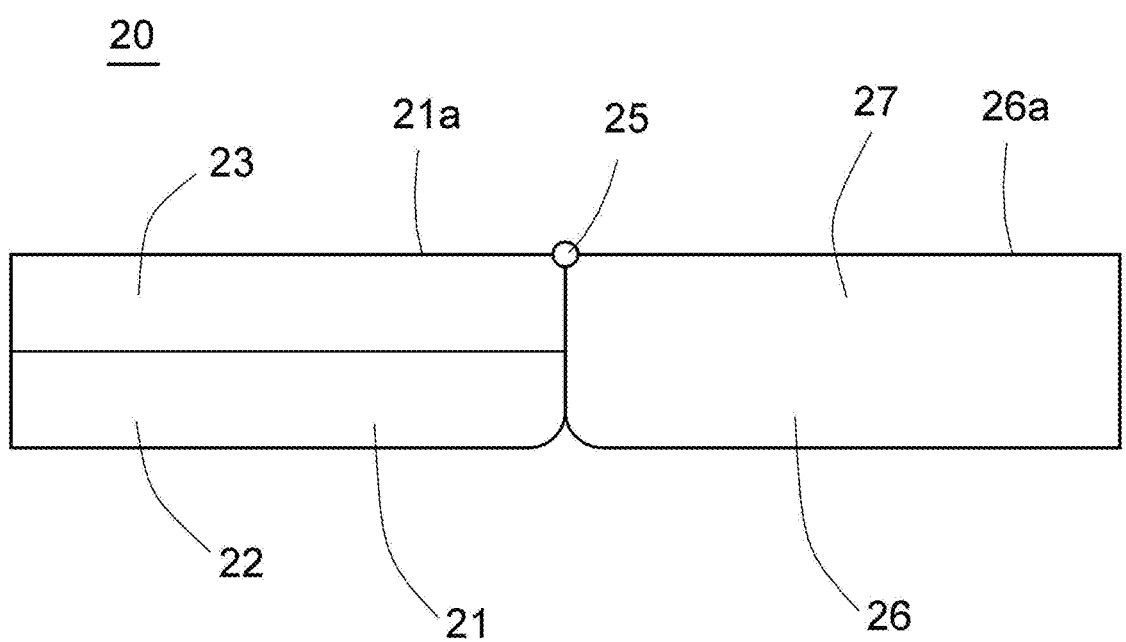
FIG. 6 is a schematic longitudinal sectional view that schematically illustrates a seat portion in the state of FIG. 5.
Figure 7:
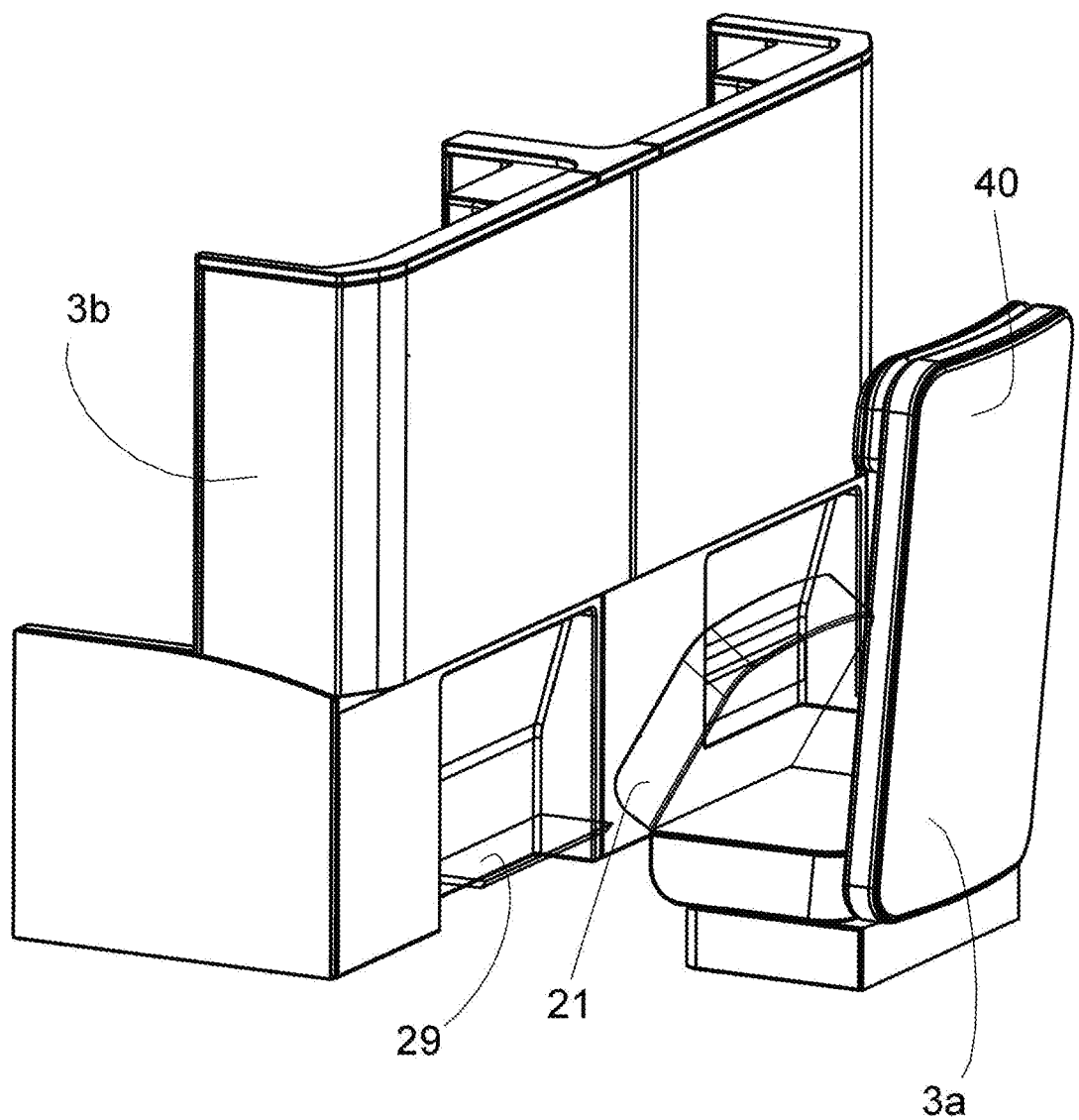
FIG. 7 is a schematic perspective view of a seat unit assembly including a first seat unit and a second seat unit. Note that FIG. 7 illustrates a state in which the state of the seat portion is a transition state between the short seat portion state and the long seat portion state.

Next, an aircraft seat unit according to the first embodiment will be described with reference to FIG. 3 to FIG. 7. FIG. 3 is a schematic perspective view of a seat unit assembly including a first seat unit 3a and a second seat unit 3b. FIG. 3 illustrates a state in which the seat portion 20 is in a short seat portion state. FIG. 4 is a schematic longitudinal sectional view that schematically illustrates a seat portion 20 in the state of FIG. 3. FIG. 5 is a schematic perspective view of a seat unit assembly including a first seat unit 3a and a second seat unit 3b. FIG. 5 shows a state in which the seat portion 20 is in a long seat portion state. FIG. 6 is a schematic longitudinal sectional view that schematically illustrates a seat portion 20 in the state of FIG. 5. FIG. 7 illustrates a state in which the state of the seat portion 20 is a transition state between a short seat portion state and a long seat portion state.

The first seat unit 3a includes a mounting portion 10 attached to the floor FL, a seat portion 20, and a backrest portion 40 (for example, a reclinable backrest).

The seat portion 20 is a member disposed on the mounting portion 10 and configured to support the buttocks of a passenger (or alternatively, the buttocks and the legs of a passenger).

As illustrated in FIG. 3, the seat portion 20 has a first buttocks support layer 22 and a second buttocks support layer 27. The first buttocks support layer 22 is a layer that directly contacts the buttocks of the passenger and supports the buttocks when the state of the seat portion 20 is in the short seat portion state (as illustrated in FIG. 3). In addition, as illustrated in FIG. 5, the second buttocks support layer 27 is a layer that directly contacts the buttocks of the passenger to support the buttocks when the state of the seat portion 20 is in the long seat portion state (as illustrated in FIG. 5).

It should be noted that, in particular, the short seat portion state refers to, for example, a state in which the passenger can sit down in a state in which their legs are bent (that is, a state in which the knee is bent). In addition, in particular, the long seat portion state refers to, for example, a state in which the passenger can sit in a state in which their legs are extended (that is, a state in which the knee is extended). The length of the seat surface (the longitudinal length) in the long seat portion state is longer than the length of the seat surface (the longitudinal length) in the short seat portion state.

In the first seat unit 3a according to the first embodiment, the seat portion 20 is configured to be capable of changing states between the short seat state portion (see FIG. 3) and the long seat state portion (see FIG. 5).

In addition, in the first seat unit 3a according to the first embodiment, the first buttocks support layer 22 (see FIG. 3) configured to support the buttocks of the passenger in the short seat portion state is harder than the second buttocks support layer 27 (see FIG. 5) configured to support the buttocks of the passenger in the long seat portion state. In order to make the first buttocks support layer 22 harder than the second buttocks support layer 27, a cushion material harder than the cushion material constituting the second buttocks support layer 27 may be used as the cushion material constituting the first buttocks support layer 22, for example.

Next, the effects will be described of the seat portion 20 being configured to be capable of changing states between a short seat portion state and a long seat portion state and the seat portion 20 comprising a second buttocks support layer 27 and a first buttocks support layer 22 that is harder than the second buttocks support layer.

A first effect is that the passenger can freely select a posture suitable for eating, working, or the like (that is, a posture in which the passenger is seated and the knees are bent) and a posture suitable for relaxing (that is, a posture in which the passenger is seated and the knees are extended).

A second effect is that the hardness of the seat can be freely selected by the passenger. When eating or performing work, a seat surface with harder cushion characteristics may be preferred. In a first embodiment, the needs of such passengers can be met. In contrast, when relaxing and enjoying in-flight entertainment, or when sleeping, a seat surface with softer cushion characteristics may be preferred. In the first embodiment, the needs of such passengers can be met. In addition, the combination of the long seat portion state (in other words, the larger seat surface) and the soft seat surface allows the passenger to freely perform posture changes such as bending and stretching of the legs on the soft seat surface. This improves passenger comfort.

A third effect is that it is possible to determine whether the passenger is in a relaxed state or in a tense state (for example, a working state), based on the state of the seat portion. Accordingly, flight attendants can speak to passengers with an understanding of the state of the passenger based on the state of the seat.

The seat portion 20 will be described in more detail.

In the example illustrated in FIG. 3, the seat portion 20 comprises an upper cushion 21 including a first buttocks support layer 22 and a lower cushion 26 including a second buttocks support layer 27. In the short seat portion state illustrated in FIG. 3, the lower cushion 26 supports the upper cushion 21.

In the short seat portion state, since the upper cushion 21 and the lower cushion 26 are stacked together, the height of the seat surface is sufficiently maintained. In addition, since the lower cushion 26 is covered with the upper cushion 21, the lower cushion 26 is unlikely to be dirtied.

As illustrated in FIG. 4, the upper cushion 21 may be deployably connected to the lower cushion 26. More particularly, the upper cushion 21 may be connected via the lower cushion 26 and a hinge portion 25. In the example illustrated in FIG. 4, the hinge portion 25 is disposed at an intersection portion between a front surface and an upper surface of the lower cushion 26. It should be noted that the hinge portion 25 may be constituted by a mechanical hinge portion (for example, a pin and a hole in which the pin is inserted, etc.). Alternatively, the hinge portion 25 may be constituted by a skin material of the seat portion 20. In other words, the skin material covering the upper cushion 21 and the skin material covering the lower cushion 26 may be connected, and the connecting portion between the skin materials may function as the hinge portion 25.

In a case in which the upper cushion 21 and the lower cushion 26 are connected via a hinge portion 25, it is easy to deploy the upper cushion 21 from the lower cushion 26. More particularly, the upper cushion 21 may be rotatably moved around the hinge portion 25. In the example illustrated in FIG. 4, by rotating the upper cushion 21 about the hinge portion 25, the upper cushion 21 is vertically inverted.

It should be noted that, in the example illustrated in FIG. 4, the surfaces that constitute the seat surface at the time of deployment of the upper cushion 21, or more particularly, the rear surface 21a of the upper cushion 21 and the upper surface 26a of the lower cushion 26, are located between the upper cushion 21 and the lower cushion 26. Therefore, at the time of non-deployment of the upper cushion 21, the rear surface 21a and the upper surface 26a are unlikely to be dirtied.

As illustrated in FIG. 5, the upper cushion 21 is preferably maintained in a state separated from the floor FL of the cabin during deployment. By having the upper cushion 21 not be in contact with the floor FL during deployment, the upper cushion 21 is prevented from becoming dirty at the time of deployment of the upper cushion 21. It should be noted that in the example illustrated in FIG. 5, a space SP exists between the upper cushion 21 and the floor FL. Accordingly, shoes or the like can be placed in the space SP.

With reference to FIG. 7, an example of a mechanism for supporting the upper cushion 21 at the time of deployment of the upper cushion 21 will be described.

In the example illustrated in FIG. 7, the aircraft seat unit assembly (3a, 3b, . . . ) includes a cushion support member 29 that is configured to be capable of changing states between a stored state and a non-stored state. In the example illustrated in FIG. 7, the cushion support member 29 is provided on the second seat unit 3b (more particularly, on the back of the second seat unit 3b arranged in front of the first seat unit 3a). Alternatively, the cushion support member 29 may be provided on the first seat unit 3a or the floor FL.

When deploying the upper cushion 21, first, the state of the cushion support member 29 is state changed from the stored state (see FIG. 3) to a non-stored state (see FIG. 7). Subsequently, the upper cushion 21 is deployed and placed on the cushion support member 29 (see FIG. 5). It should be noted that in the examples illustrated in FIG. 3, FIG. 5, and FIG. 7, the cushion support member 29 is rotatably attached to the second seat unit 3b, but the cushion support member 29 may be slidably mounted to the second seat unit 3b. In addition, in the examples illustrated in FIG. 3, FIG. 5, and FIG. 7, the cushion support member 29 is a plate-like member, but the cushion support member 29 may be a rod-shaped member, or alternatively a block-shaped member.

An example of the upper cushion 21 will be further described with reference to FIG. 4 and FIG. 6. In the example illustrated in FIG. 4, the upper cushion 21 includes a first buttocks support layer 22 and a second support layer 23 positioned below the first buttocks support layer 22 in the short seat portion state. As illustrated in FIG. 6, in the long seat portion state, the vertical arrangement of the upper cushion 21 is reversed from that of the short seat portion state. Accordingly, in the long seat portion state, the second support layer 23 is positioned above the first buttocks support layer 22. The second support layer 23 then comes into direct contact with the lower leg portion of the passenger.

In the first embodiment, the second support layer 23 is preferably softer than the first buttocks support layer 22. Due to the softness of the second support layer 23, the lower leg portion of the passenger is softly supported by the second support layer 23.

In order to make the second support layer 23 softer than the first buttocks support layer 22, a cushion material harder than the cushion material constituting the first buttocks support layer 22 may be used as the cushion material constituting the second support layer 23, for example.

Subsequently, with reference to FIG. 6, an example of the relationship between the surfaces constituting the seat surface in the long seat portion state, or more particularly, the rear surface 21a of the upper cushion 21 and the upper surface 26a of the lower cushion 26, will be described. In the example described in FIG. 6, the rear surface 21a of the upper cushion 21 and the upper surface 26a of the lower cushion 26 are flush. For this reason, in the long seat condition, the first seat unit 3a can function in the same manner as a Japanese-style legless chair. In the example illustrated in FIG. 6, a passenger seated on the seat surface of the seat portion 20 in the long seat portion state can completely relax.

Second Embodiment

Figure 8:
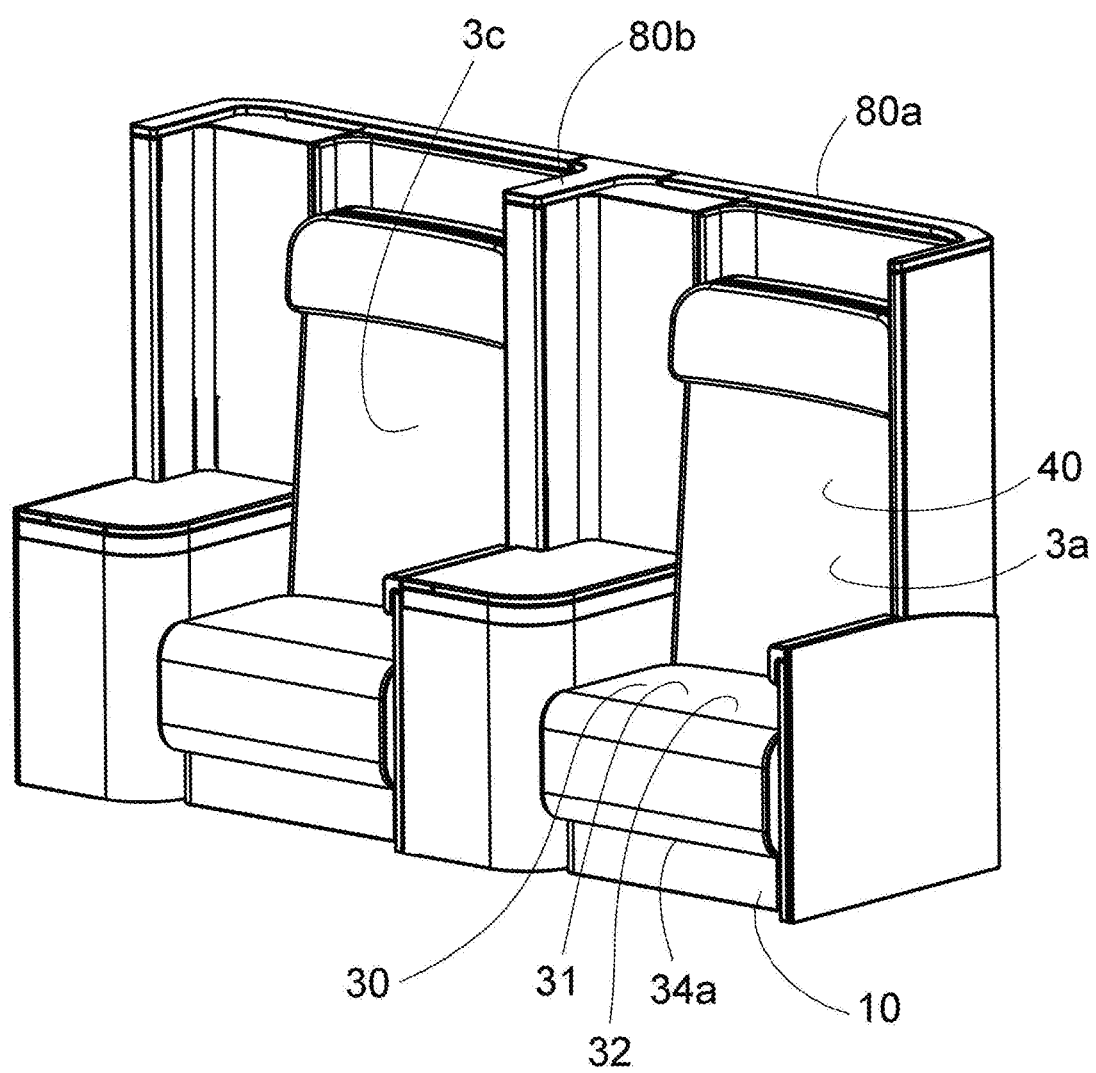
FIG. 8 is a schematic perspective view of a first seat unit and a third seat unit. Note that FIG. 8 illustrates a state in which the seat portion is in the short seat portion state.
Figure 9:
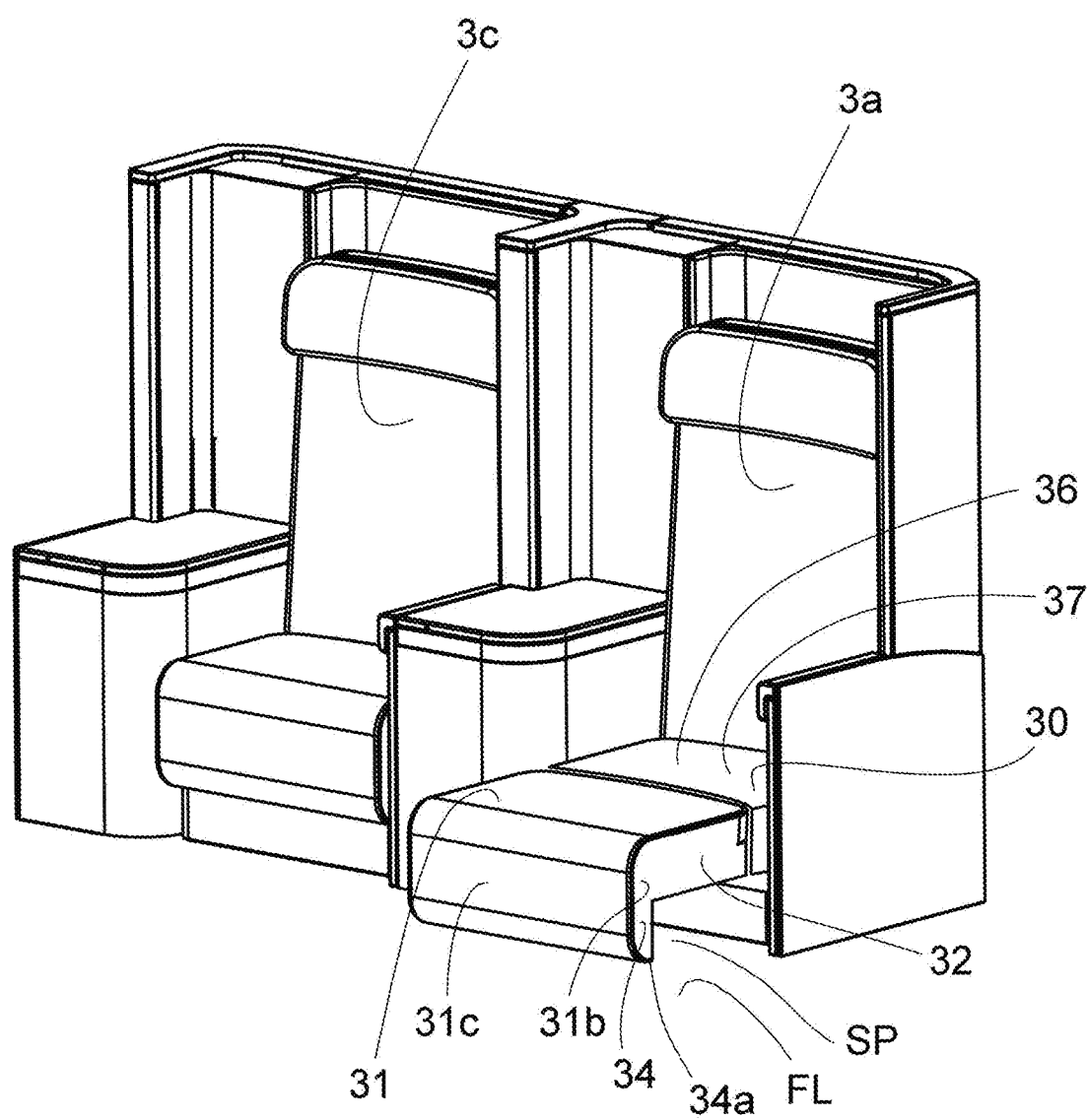
FIG. 9 is a schematic perspective view of a first seat unit and a third seat unit. Note that FIG. 9 illustrates a state in which the seat portion is in the long seat portion state.
Figure 10:
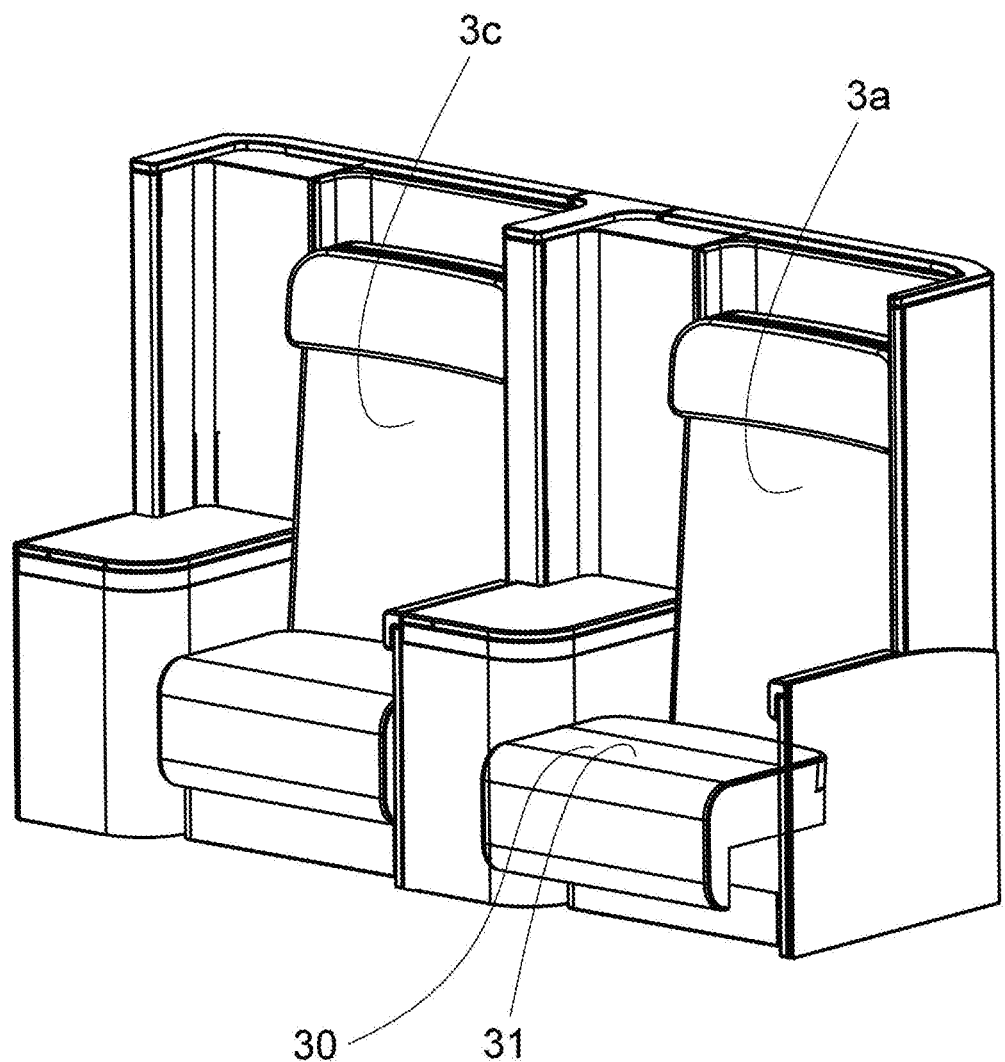
FIG. 10 is a schematic perspective view of the first seat unit. Note that FIG. 10 illustrates a state in which the state of the seat portion is a transition state between the short seat portion state and the long seat portion state.
Figure 11:
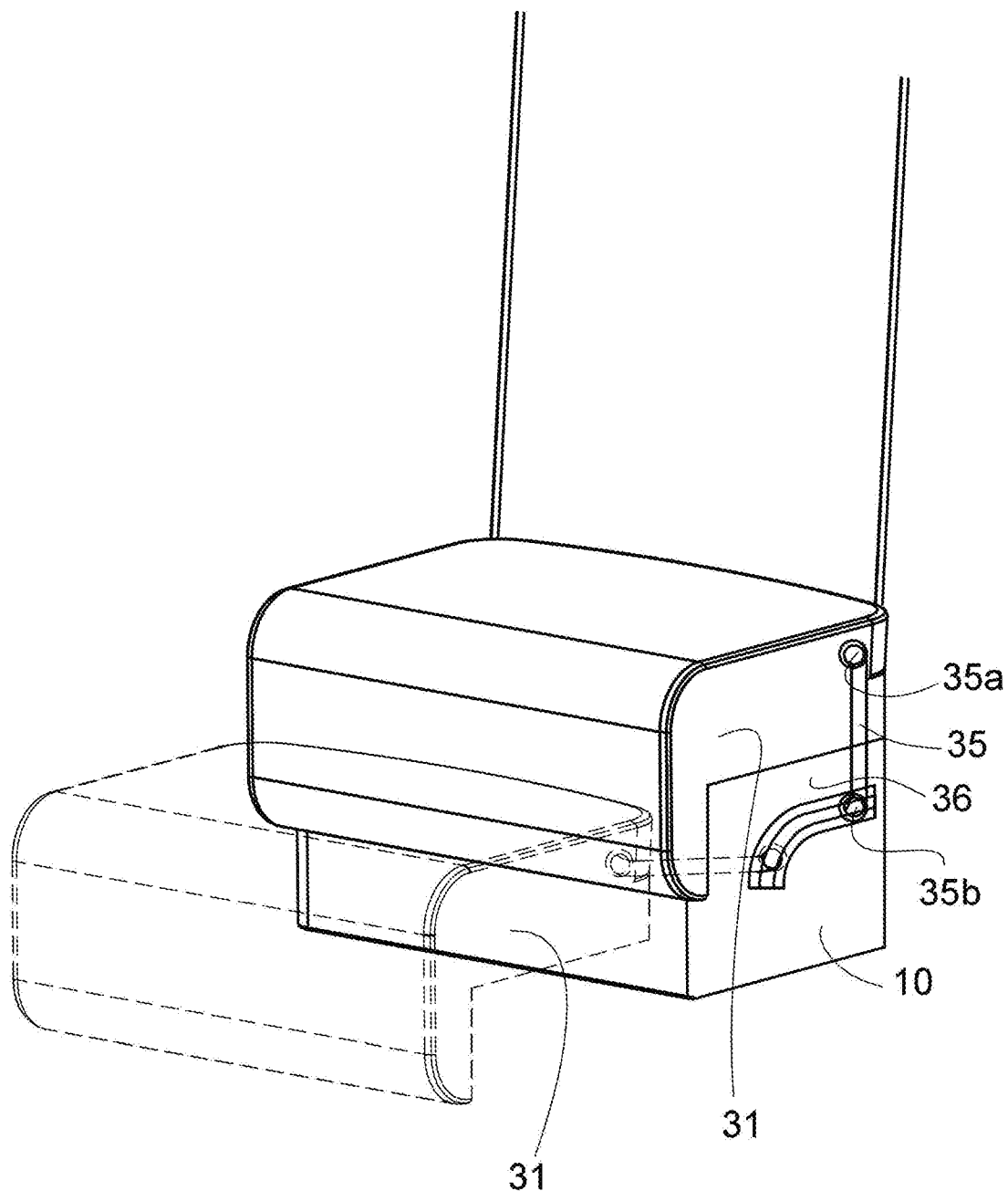
FIG. 11 is a diagram for explaining an example of a mechanism for configuring the upper cushion so as to be capable of being pulled out in a forward direction.

Next, an aircraft seat unit according to the second embodiment will be described with reference to FIG. 8 to FIG. 11. FIG. 8 to FIG. 10 are schematic perspective views of the first seat unit 3a and the third seat unit 3c. FIG. 8 illustrates a state in which the state of the seat portion 30 is in the short seat portion state, and FIG. 9 illustrates a state in which the state of the seat portion 30 is in the long seat portion state. In addition, FIG. 10 illustrates a state in which the state of the seat portion 30 is a transition state between the short seat portion state and the long seat portion state. FIG. 11 is a diagram for explaining an example of a mechanism for configuring the upper cushion 31 so as to be capable of being pulled out in a forward direction.

As illustrated in FIG. 8, the first seat unit 3a comprises a mounting portion 10 mounted on the floor, a seat portion 30, and a backrest portion 40 (for example, a reclinable backrest).

The seat portion 30 is a member that is disposed on the mounting portion 10 and supports the buttocks of the passenger (or alternatively, the buttocks and the legs of the passenger).

As illustrated in FIG. 9, the seat portion 30 includes a first buttocks support layer 32 and a second buttocks support layer 37. The first buttocks support layer 32 is a layer that directly contacts the buttocks of the passenger and supports the buttocks when the state of the seat portion 30 is in the short seat portion state (the state illustrated in FIG. 8). Also, as illustrated in FIG. 9, the second buttocks support layer 37 is a layer that directly contacts the buttocks of the passenger and supports the buttocks when the state of the seat portion 30 is in the long seat portion state (the state illustrated in FIG. 9).

In the first seat unit 3a according to the second embodiment, the seat portion 30 is configured to be capable of changing between the short seat portion state (see FIG. 8) and the long seat portion state (see FIG. 9).

In addition, in the first seat unit 3a according to the second embodiment, the first buttocks support layer 32 (see FIG. 8) configured to support the buttocks of the passengers in the short seat portion state is harder than the second buttocks support layer 37 (see FIG. 9) configured to support the buttocks of the passengers in the long seat portion state. In order to make the first buttocks support layer 32 harder than the second buttocks support layer 37, a cushion material harder than the cushion material constituting the second buttocks support layer 37 may be used as the cushion material constituting the first buttocks support layer 32, for example.

Since the effects of the seat portion 30 being configured to be capable of changing states between a short seat portion state and a long seat portion state and the seat portion 30 comprising a second buttocks support layer 37 and a first buttocks support layer 32 that is harder than the second buttocks support layer have already been described with respect to the first embodiment, a redundant explanation will be omitted here.

The seat portion 30 will now be described in more detail.

In the examples illustrated in FIG. 8 and FIG. 9, the seat portion 30 comprises an upper cushion 31 including a first buttocks support layer 32 and a lower cushion 36 including a second buttocks support layer 37. In the short seat portion state illustrated in FIG. 8, the upper cushion 31 is supported by the lower cushion 36.

In the second embodiment, the upper cushion 31 can be pulled out in the forward direction without being vertically inverted. In the second embodiment, since the upper cushion 31 does not vertically invert, it is not necessary to provide a hinge portion between the upper cushion 31 and the lower cushion 36. Accordingly, the hinge portion does not adversely affect the cushioning characteristics of the seat surface.

In the example illustrated in FIG. 11, an upper cushion 31 and either a lower cushion 36 or a mounting portion 10 are connected via a connecting member 35. In the example illustrated in FIG. 11, one end 35a of the connecting member 35 is rotatably supported by the upper cushion 31, and the other end 35b of the connecting member 35 is pivotably and slidably supported by either the lower cushion 36 or the mounting portion 10. It should be noted that the mechanism for allowing the upper cushion 31 to be pulled out in the forward direction is not limited to the example illustrated in FIG. 11. Put differently, as the mechanism for allowing the upper cushion 31 to be pulled out in the forward direction, a pivot mechanism and/or a slide mechanism may be employed, or any mechanism other than these mechanisms may be employed.

As illustrated in FIG. 9, a cushion supporting portion 34 that contacts the floor FL of the cabin and supports the upper cushion 31 may be provided at the lower portion of the upper cushion 31.

In the example illustrated in FIG. 9, the upper cushion 31 includes a front surface portion 31b, and the cushion support portion 34 is disposed so as to protrude downward from the front surface portion 31b. It should be noted that the front surface portion 31b is a portion that faces the calf of the passenger in the short seat portion state.

In the example illustrated in FIG. 9, the contact portion 34a between the floor and the cushion support portion 34 is disposed at a position retracted further rearward than the forward direction surface 31c of the front surface portion 31b. Accordingly, in the short seat portion state, the contact portion 34a is prevented from coming into contact with the legs of the passenger. In this way, dirtying of the legs of the passenger can be avoided. It should be noted that in the example illustrated in FIG. 9, a space SP exists between the upper cushion 31 and the floor FL. Accordingly, shoes or the like can be placed in the space SP.

(Other Configurations)

Figure 12:
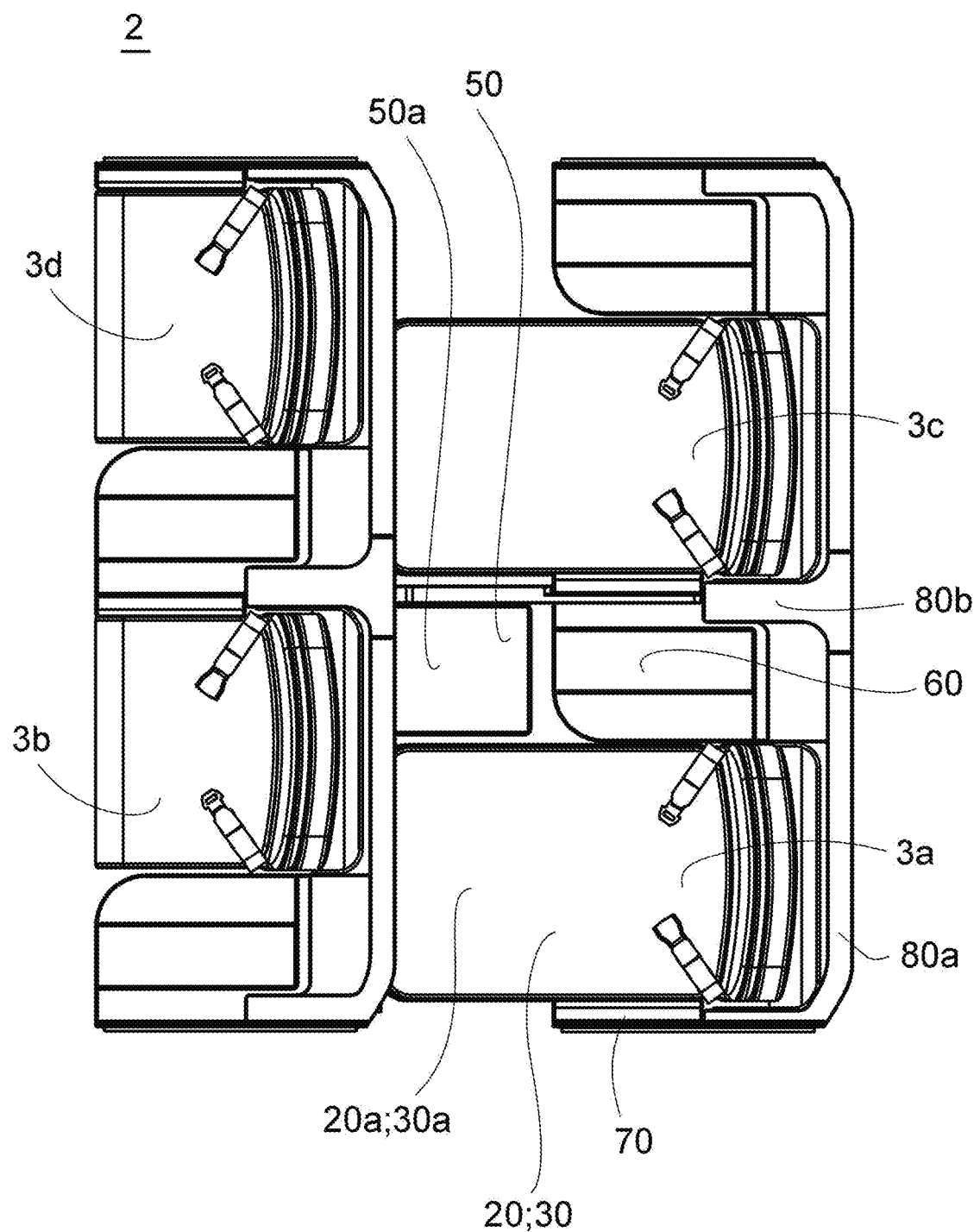
FIG. 12 is a schematic plan view that schematically illustrates a seat unit assembly.

Referring to FIG. 12, another exemplary configuration of the first seat unit 3a or the seat unit assembly 2 will be described. FIG. 12 is a schematic plan view that schematically illustrates the seat unit assembly.

As illustrated in FIG. 12, the first seat unit 3a may include an ottoman 50 (in other words, a footrest). It is preferable that the ottoman 50 be configured to be capable of being stored in the first seat unit 3a or the second seat unit 3b, and be capable of being pulled out from the first seat unit 3a or the second seat unit 3b. The ottoman 50 may be stored in the back portion of the second seat unit 3b, or may be stored below the table 60 of the first seat unit 3a, for example. It should be noted that, as a mechanism for configuring the ottoman 50 to be capable of being stored and pulled out, it is possible to adopt any mechanism such as a hinge mechanism, a slide mechanism, a link mechanism, or the like.

In the example illustrated in FIG. 12, an ottoman 50 in a pulled-out state is disposed on the side of the seat portion in the long seat portion state (20; 30). The surface (20a; 30a) of the seat portion 20 and the surface 50a of the ottoman 50 form an L-shaped seat surface in a plan view. It should be noted that it is preferable that the surface (20a;30a) of the seat portion 20 and the surface 50a of the ottoman 50 be flush with each other; that is, to have the same height.

In the example illustrated in FIG. 12, the first seat unit 3a includes an L-shaped seat surface. This allows the passenger to extend his legs to the side. Accordingly, a passenger seated on the L-shaped seat surface can fully relax.

As illustrated in FIG. 12, the first seat unit 3a may include a table 60 on the side of the seat portion (20; 30). In addition, a storage unit capable of storing a small bag or the like may be provided below the table 60. Alternatively or additionally, the first seat unit 3a may comprise an armrest 70 on the side of the seat portion (20; 30).

As illustrated in FIG. 12, the first seat unit 3a may include partitions (80a; 80b). In the embodiment illustrated in FIG. 12, the partition 80a is provided in the rear portion of the first seat unit 3a. The partition 80b is provided in the side portion of the first seat unit 3a.

In the examples illustrated in FIG. 12, the first seat unit 3a and the third seat unit 3c on the side of the first seat unit 3a are integrally configured. Alternatively, the first seat unit 3a may be configured independently of the other seat units.

Although FIG. 12 illustrates an example in which the seat unit assembly includes four seat units (3a, 3b, 3c, 3d), the number of seat units included in the seat unit assembly 2 may be two, three, or five or more.

In the embodiments described above, each passenger can select the hardness of the seat surface, the width of the seat surface, and his/her seating posture according to his/her own preference. Accordingly, this improves the comfort of the passengers in the aircraft.

It should be noted that the present invention is not limited to the above-described embodiments. Within the scope of the present invention, it is possible to freely combine the above-described embodiments, to modify any component of each embodiment, or to omit any component in each embodiment.

For example, in embodiments, an example has been described in which the state change between the short seat portion state and the long seat portion state is performed manually. Alternatively, the state change between the short seat portion state and the long seat portion state may be performed electrically.

In addition, in the above embodiments, an example has been described in which the upper cushion 21 or 31 is supported by either the cushion support member 29 or the cushion support portion 34. However, various modifications can be adopted as the method of supporting the upper cushion 21, 31.

An example of a method of supporting the upper cushion 21 will be described with reference to FIG. 13 to FIG. 15.

Figure 13:
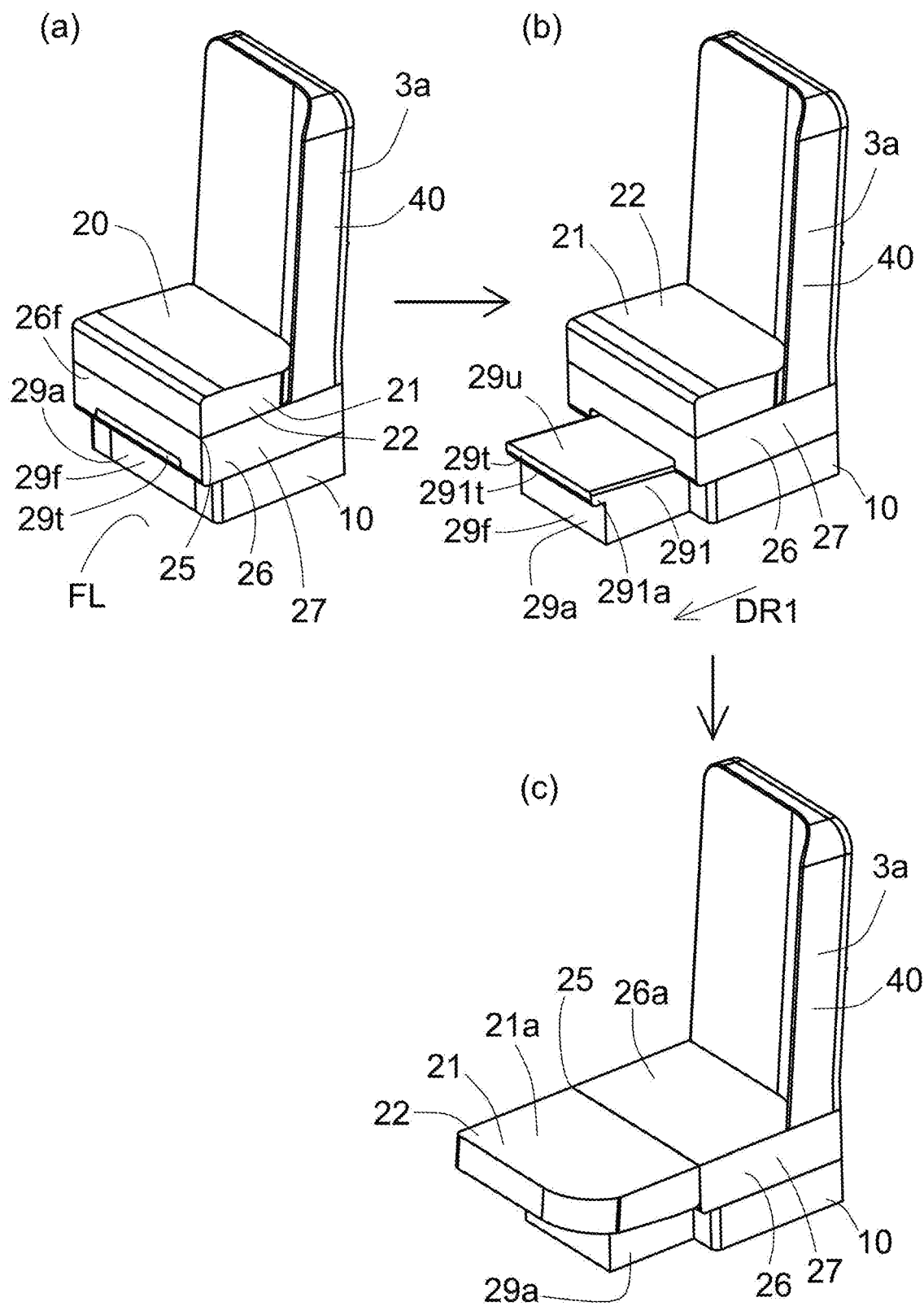
FIG. 13 is a schematic perspective view that schematically illustrates an example of the first seat unit. Note that FIG. 13($a$) illustrates a state in which the cushion support member is in a stored position, FIG. 13($b$) illustrates a state in which the cushion support member is in a pull-out position, and FIG. 13($c$) illustrates a state of the seat portion in a long seat portion state.

In the embodiment illustrated in FIG. 13, the first seat unit 3a comprises a seat portion 20 having a first buttocks support layer 22 and a second buttocks support layer 27, and a backrest portion 40. The seat portion 20 is configured to be capable of changing states between a short seat portion state (see FIG. 13(a)) and a long seat portion state (see FIG. 13(c)). The first buttocks support layer 22, which is configured to support the buttocks of the passenger in the short seat portion state, is preferably harder than the second buttocks support layer 27, which is configured to support the buttocks of the passenger in the long seat portion state. Since the first buttocks support layer 22, the second buttocks support layer 27, and the seat portion 20 have been described in the above embodiment, a redundant description of the configuration thereof will be omitted here.

In the example illustrated in FIG. 13, the first seat unit 3a includes a cushion support member 29a configured to support the upper cushion 21. In the example illustrated in FIG. 13, the cushion support member 29a is stored below the lower cushion 26 so as to be capable of being pulled out.

When the cushion support member 29a is in the stored position, since the cushion support member 29a is covered from above by the lower cushion 26, the cushion support member 29a will not be dirtied during storage. In addition, when the cushion support member 29a is in the stored position, since the cushion support member 29a is covered from above by the lower cushion 26, the cushion support member 29a will not become an impediment during storage.

When the cushion support member 29a is in the stored position, the lower front surface 29f of the cushion support member 29a is preferably in a retracted position behind the front surface 26f of the lower cushion 26. Alternatively or additionally, the lower front surface 29f of the cushion support member 29a is preferably further rearward than the upper front surface 29t of the cushion support member 29a. By putting the lower front surface 29f of the cushion support member 29a in a retracted position, the cushion support member 29a is further prevented from becoming an impediment during storage.

In the example illustrated in FIG. 13(b), a projecting portion 291a that projects further forward than the lower portion of the cushion support member 29a is provided on the upper portion 291 of the cushion support member 29a. A handle portion 291t for pulling out the cushion support member 29a may be provided on the lower surface of the projecting portion 291a.

Next, an example of a method of using the cushion support member 29a will be described. In the first step, the cushion supporting member 29a is pulled out from the stored position (see FIG. 13(a)) to the pull-out position (see FIG. 13(b)). It should be noted that the pull-out position is located in front of the stored position (in other words, in a plan view, when the direction from the backrest portion 40 toward the seat portion 20 is defined as a first direction DR1, the pull-out position is located on the first direction DR1 side of the stored position).

It should be noted that the distance from the stored position to the pull-out position, in other words, the movement stroke of the cushion support member 29a is, for example, greater than or equal to 200 mm and less than or equal to 500 mm, or more preferably, greater than or equal to 250 mm and less than or equal to 450 mm.

In the second step, the upper cushion 21 is placed on the cushion support member 29a in the pull-out position. In a case that the upper cushion 21 is deployably connected to the lower cushion 26, by deploying the upper cushion 21, the upper cushion 21 is placed on the cushion support member 29a. In the example illustrated in FIG. 13(c), the upper cushion 21 is connected to the lower cushion 26 via a hinge portion 25. In this case, by rotating the upper cushion 21 about the hinge portion 25, the upper cushion 21 is placed on the cushion support member 29a.

Alternatively, as illustrated in FIG. 11, in a case that the upper cushion 21 is configured to be capable of being pulled out in the forward direction, by pulling the upper cushion 21 out in the forward direction, the upper cushion 21 is placed on the cushion support member 29a.

Figure 14:
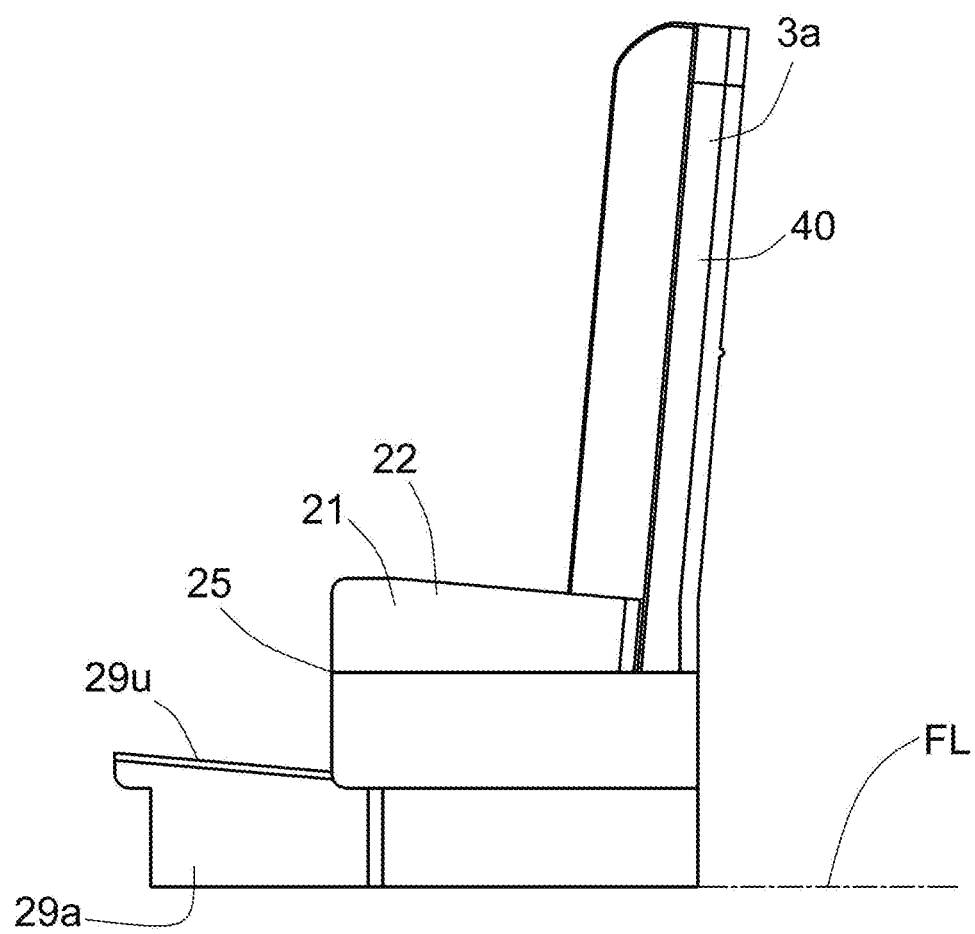
FIG. 14 is a side view that schematically illustrates an example of the first seat unit.

As illustrated in FIG. 14, the upper surface 29u of the cushion support member 29a may be an inclined surface inclined with respect to the horizontal plane (more specifically, an inclined surface which becomes lower toward the rear direction). In the example illustrated in FIG. 14, the upper surface 29u of the cushion support member 29a is an inclined surface in which the upper surface of the upper cushion 21 becomes lower toward the rear direction. Then, when the upper cushion 21 is deployed by rotating around the hinge portion 25, the inclination of the upper surface of the upper cushion 21 (the surface corresponding to the "lower surface" in the deployment position) coincides with the inclination of the upper surface 29u of the cushion support member 29a.

Figure 15:
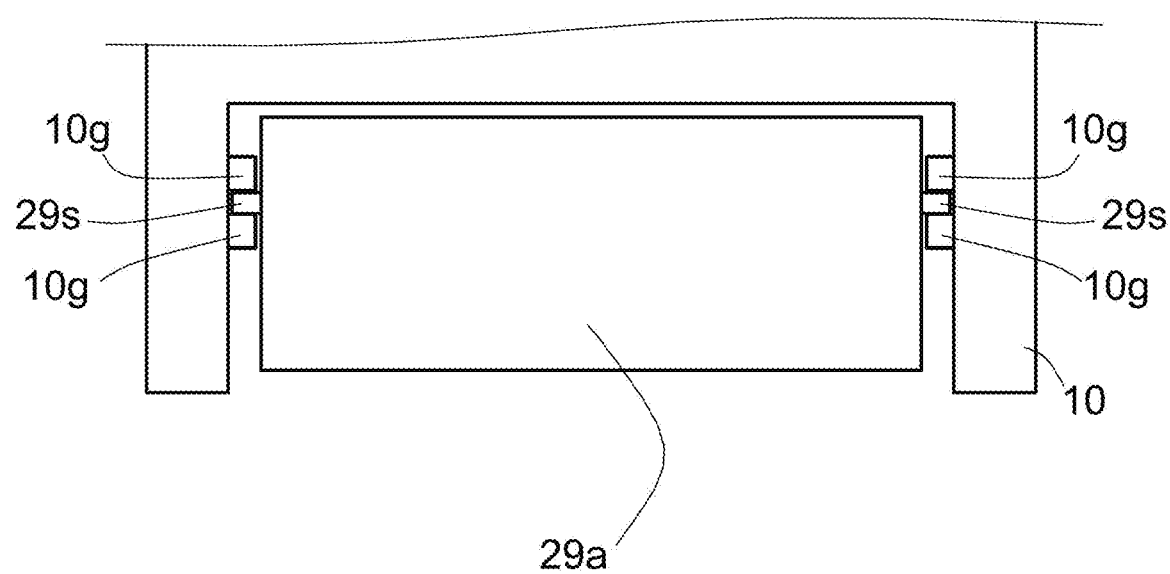
FIG. 15 is a schematic front view that schematically illustrates an example of a pull-out mechanism for pulling out the cushion support member.

As illustrated in FIG. 15, the mounting portion 10 of the first seat unit 3a may be provided with a guide member 10g (for example, a guide rail) for slidably supporting the cushion support member 29a. In addition, the cushion support member 29a may be provided with a slide member 29s directly supported by the guide member 10g.

In the examples illustrated in FIG. 13 to FIG. 15, the upper cushion 21 in the long seat portion state can be maintained in a state separated from the floor surface. Accordingly, in the long seat portion state, the surface of the upper cushion 21 is prevented from becoming dirty.

In addition, in the above-described embodiment (the embodiment illustrated in FIG. 12), an example has been described in which an ottoman 50 is disposed. Various modifications may be employed with respect to the placement and structure of the ottoman.

Referring to FIG. 16 to FIG. 19, an example of the arrangement and structure of the ottoman 50b will be described.

Figure 16:
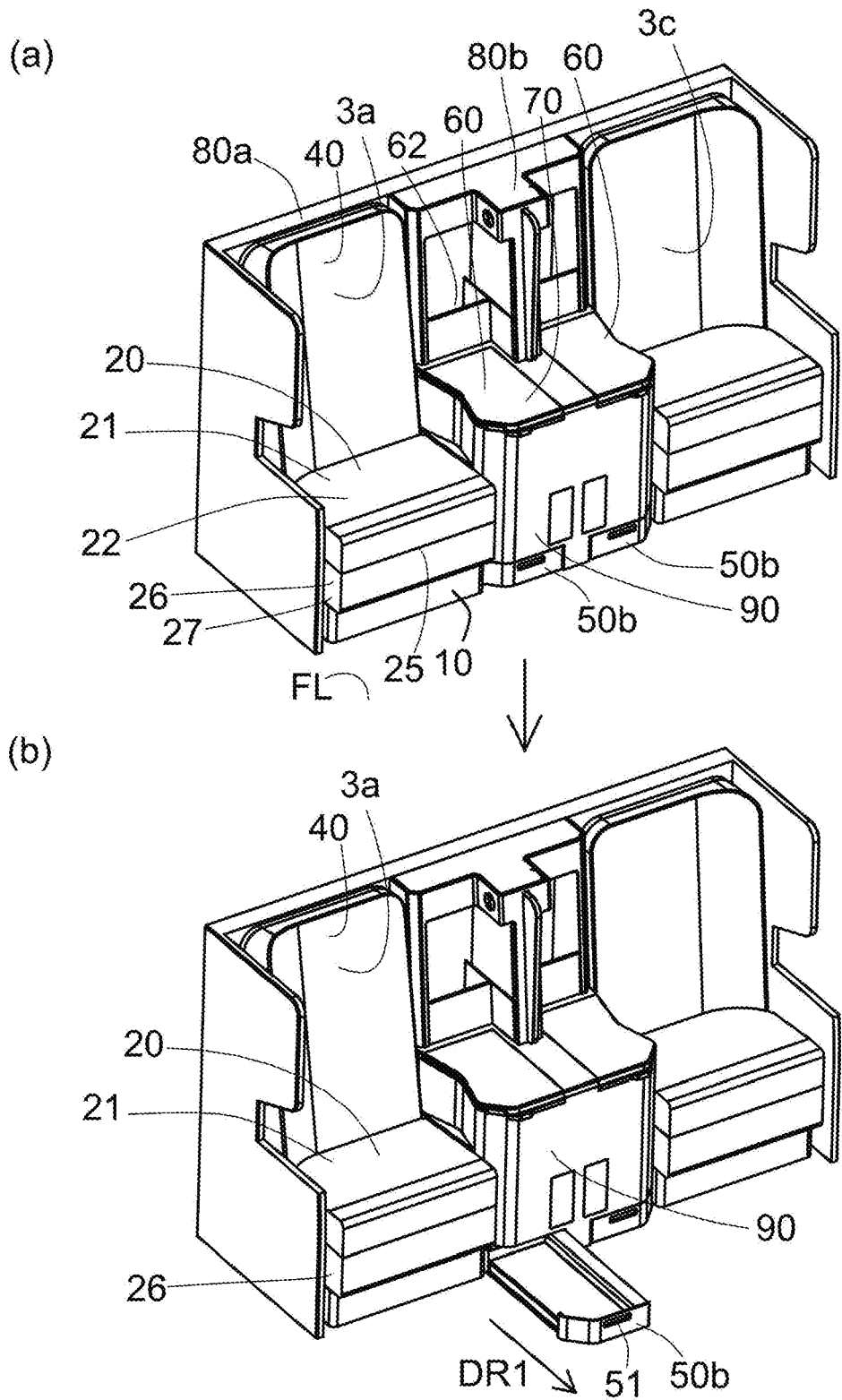
FIG. 16 is a schematic perspective view that schematically illustrates an example of the first seat unit and the third seat unit. Note that FIG. 16($a$) illustrates a state in which the ottoman is in a stored position, and FIG. 16($b$) illustrates a state in which the ottoman is in a pull-out position.

In the embodiment illustrated in FIG. 16, the first seat unit 3a includes a side structure 90 and an ottoman 50b (in other words, a footrest).

The side structure 90 is a structure disposed on the side of the seat portion 20. The side structure 90 may be the table 60, a storage member including a storage portion 62 capable of storing articles such as small bags or the like, the table 60 equipped with the storage portion 62, or the armrest 70.

In the example illustrated in FIG. 16, the ottoman 50b is stored under the side structure 90 so as to be capable of being pulled out.

When the ottoman 50b is in the stored position, since the ottoman 50b is covered from above by the side structure 90, the ottoman 50b will not be dirtied during storage. In addition, when the ottoman 50b is in the stored position, since the ottoman 50b is covered from above by the side structure 90, the ottoman 50b will not become an impediment during storage. The ottoman 50b may be provided with a handle portion 51 for pulling out the ottoman 50b.

Subsequently, an example of the method of using the ottoman 50b will be described. In the first step, the ottoman 50b is pulled out from the stored position (see FIG. 16(a)) to the pull-out position (see FIG. 16(b)). It should be noted that the pull-out position is located in front of the stored position (in other words, in a plan view, when the direction from the backrest portion 40 toward the seat portion 20 is defined as a first direction DR1, the pull-out position is located on the first direction DR1 side of the stored position).

In a second step, the position of the ottoman 50b is changed from a first position in front of the side structure 90 (see FIG. 16(b)) to a second position to the side of the first position and in front of the seat portion 20 (see FIG. 17(a)). In the example illustrated in FIG. 17(a), by rotating the ottoman 50b about an axis parallel to the vertical direction as indicated by the arrow AR, the position of the ottoman 50b is changed from the first position (see FIG. 16(b)) to the second position (see FIG. 17(a)). In the example illustrated in FIG. 16(b), the first position is obliquely forward of the seat portion 20, and in the example illustrated in FIG. 17(a), the second position is directly in front of the seat portion 20.

In a third step, the angle of the upper surface 50u of the ottoman 50b with respect to the horizontal plane may be angularly changed from a first angle to a second angle greater than the first angle. In the example illustrated in FIG. 17(b), the ottoman 50b comprises a horizontally parallel rotating shaft 50x, and the upper surface 50u can rotate around the rotating shaft. By making it possible to adjust the inclination of the upper surface 50u of the ottoman 50b with respect to the horizontal plane, the passenger can select the most comfortable posture for their legs.

Figure 17:
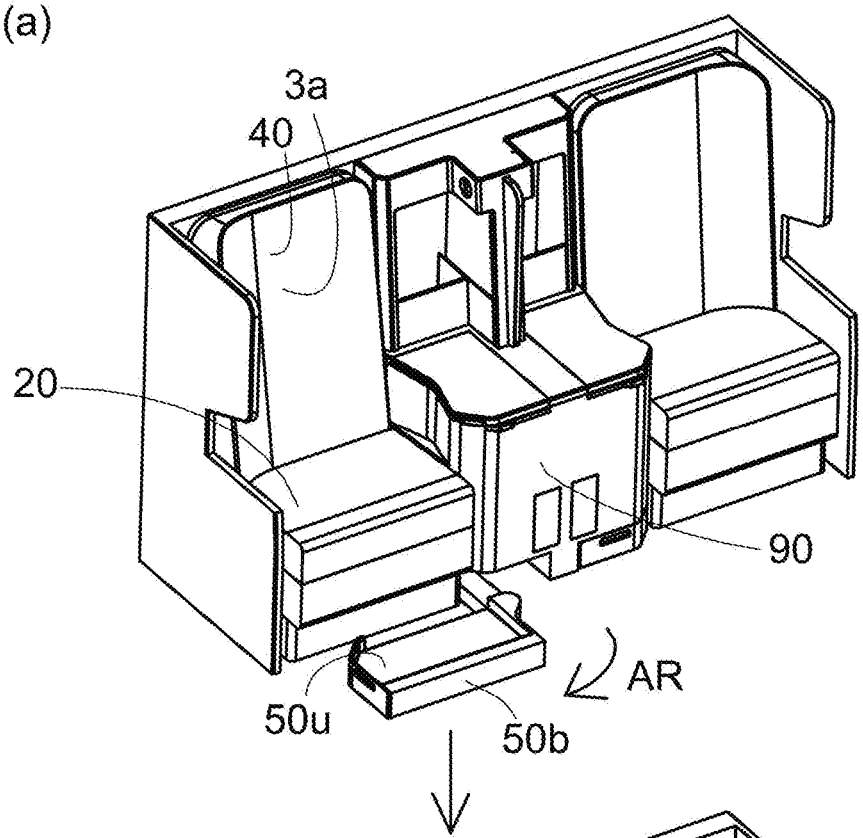
FIG. 17 is a schematic perspective view that schematically illustrates an example of the first seat unit and the third seat unit. Note that FIG. 17($a$) illustrates a state in which the ottoman is directly in front of the seat portion, and FIG. 17($b$) illustrates a state in which an upper surface of the ottoman is inclined.
Figure 17:
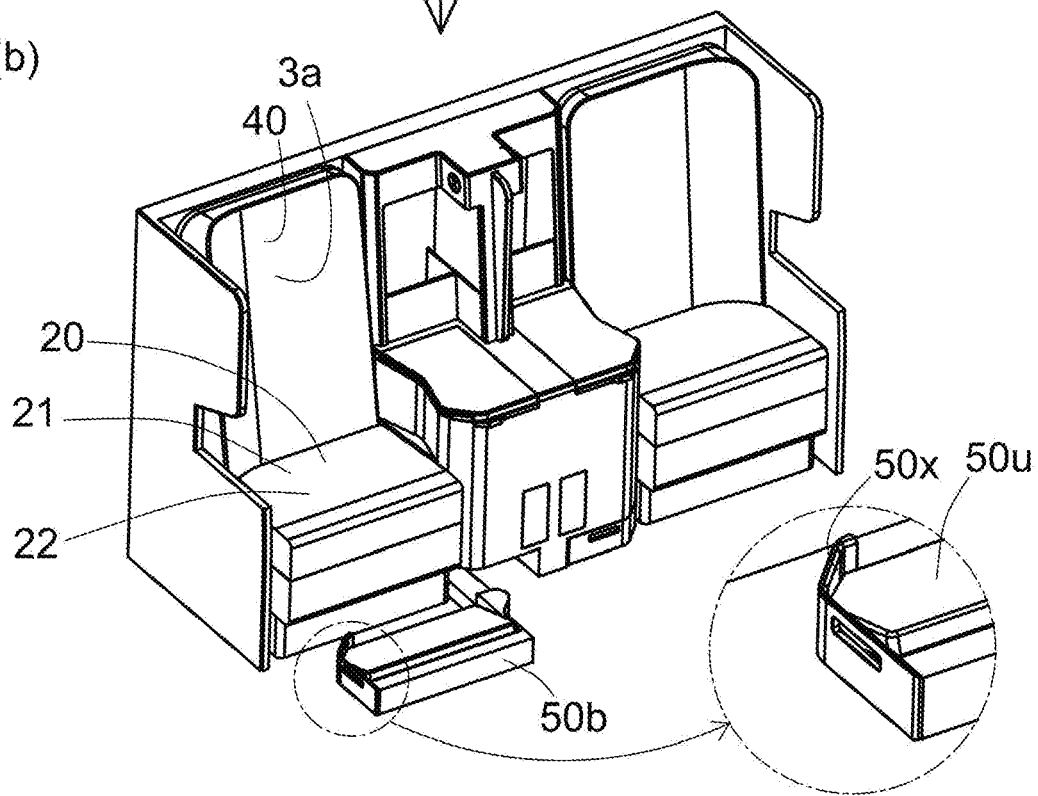

In FIG. 16 and FIG. 17, an example was described in which the position of the ottoman 50b is position changed from a first position in front of the side structure 90 (see FIG. 16(b)) to a second position to the side of the first position and in front of the seat portion 20 (see FIG. 17(a)) in the second step. Alternatively, in the second step, the state of the seat portion 20 may be changed from the short seat portion state to the long seat portion state.

Figure 18:
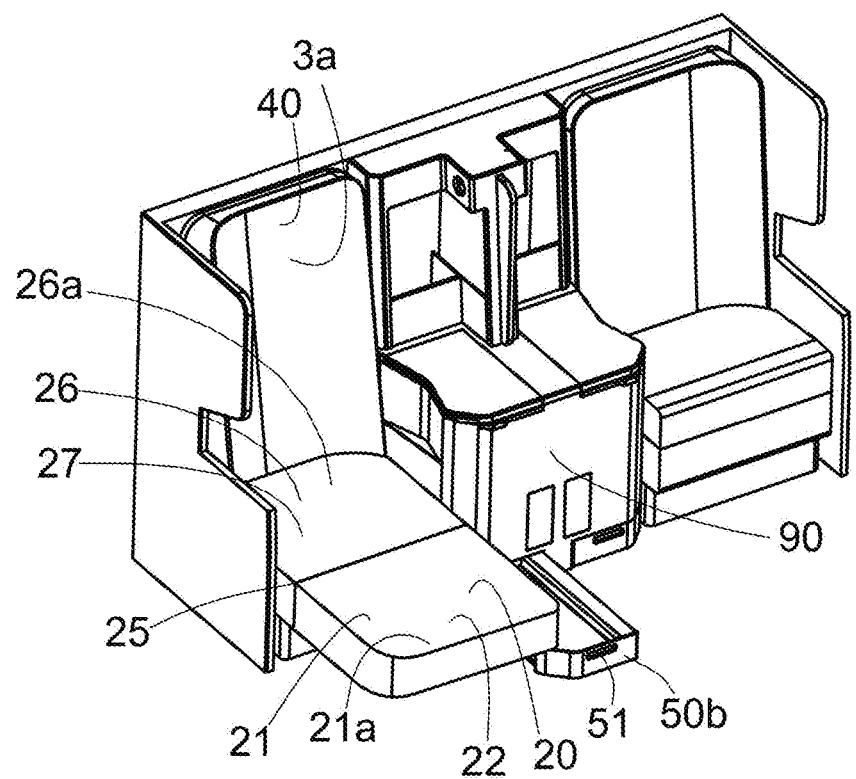
FIG. 18 is a schematic perspective view that schematically illustrates an example of the first seat unit and the third seat unit.

In the example illustrated in FIG. 18, in the second step, as a result of the position of the upper cushion 21 being position changed from an upper position of the lower cushion 26 (see FIG. 16(b)) to a front position of the lower cushion 26 (see FIG. 18.), the state of the seat portion 20 is changed from the short seat portion state to the long seat portion state. More particularly, as a result of the upper cushion being deployed in front of the lower cushion 26, the state of the seat portion 20 is changed from the short seat portion state to the long seat portion state. Alternatively, as illustrated in FIG. 11, as a result of the upper cushion 21 being pulled out in the forward direction, the state of the seat portion 20 may be changed from the short seat portion state to the long seat portion state.

In the example illustrated in FIG. 18, in the long seat portion state, an L-shaped surface is formed by the surface of the seat portion 20 and the surface of the ottoman 50b in a plan view. In this case, the passenger can then place his or her feet on the ottoman 50b on the side of the seat portion 20, with his or her buttocks and thighs supported by the seat portion 20. Thus, the passenger can assume a relaxed posture.

Subsequently, with reference to FIG. 19, examples will be described of a pull-out mechanism for pulling-out the ottoman 50b and a rotating mechanism for rotating the ottoman 50.

First, the pull-out mechanism for pulling out the ottoman 50b will be described. In the example illustrated in FIG. 19, the side structure 90 includes a guide member 90g, (for example, a guide rail). In addition, the first seat unit 3a includes a slide member 52 slidably movable along the guide member 90g, and the side structure 90 and the ottoman 50b are connected to each other via the slide member 52.

Figure 19:
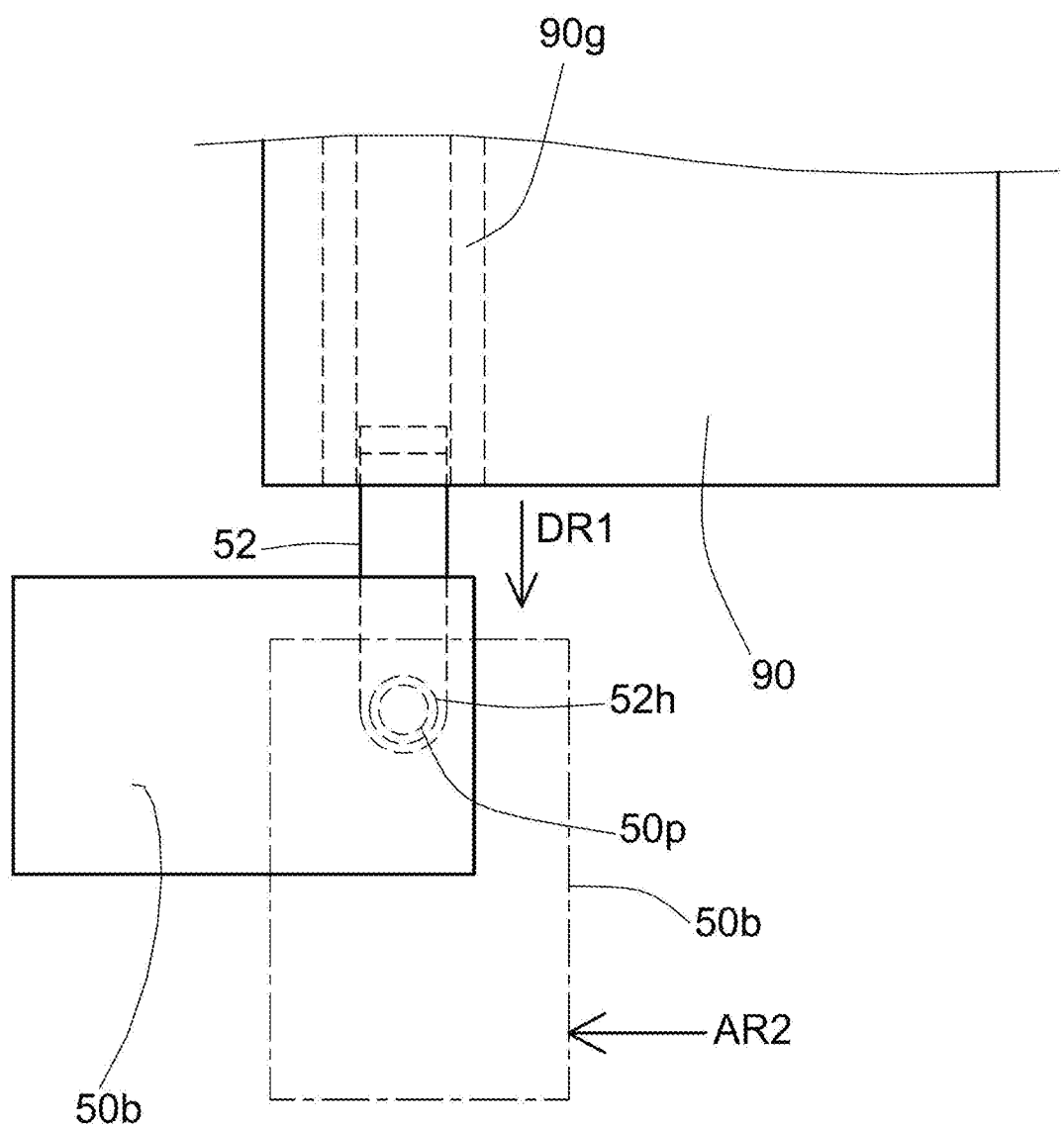
FIG. 19 is a schematic plan view that schematically illustrates an example of a pull-out mechanism for pulling out an ottoman and a rotating mechanism for rotating an ottoman.

In the embodiment illustrated in FIG. 19, when the ottoman 50b is pulled in the first direction DR1, the slide member 52 is pulled out while being guided by the guide member 90g of the side structure 90. As a result, the ottoman 50b is pulled out to the pull-out position indicated by the dotted line. It should be noted that, in order to return the ottoman 50b to the stored position, the ottoman 50b may be pushed in a direction opposite to the first direction DR1.

Next, a rotation mechanism for rotating the ottoman 50b will be described. In the example illustrated in FIG. 19, a through hole 52h is provided in the slide member 52, and a pin member 50p to be inserted into the through hole 52h is provided in the ottoman 50b.

In the example illustrated in FIG. 19, when the ottoman 50b is pressed in the arrow AR2 direction, the ottoman 50b rotates about the pin member 50p (in other words, about an axis parallel to the vertical direction). Thus, the ottoman 50b can be rotated about an axis parallel to the vertical direction (for example, rotated 90 degrees about an axis parallel to the vertical direction), and the position of the ottoman 50b can be changed from the first position directly in front of the side structure 90 to the second position directly in front of the seat portion 20.

It should be noted that, the examples described in FIG. 19 are only examples of the pull-out mechanism for pulling-out the ottoman 50b and the rotation mechanism for rotating the ottoman 50b. Various modifications of these mechanisms can be employed.

REFERENCE SIGNS LIST

1: Aircraft, 2: Aircraft seat unit assembly, 3: Seat unit, 3a: First seat unit, 3b: Second seat unit, 3c: Third seat unit, 10: Mounting portion, 10g: Guide member, 20: Seat portion, 20a: Surface, 21: Upper cushion, 21a: Rear surface, 22: First buttocks support layer, 23: Second support layer, 25: Hinge, 26: Lower cushion, 26a: Upper surface, 26f: Front surface, 27: Second buttocks support layer, 29, 29a: Cushion support member, 29f: Lower front surface, 29s: Slide member, 29t: Upper front surface, 29u: Upper surface, 30: Seat portion, 31: Upper cushion, 31b: Front surface portion, 31c: Forward direction surface, 32: First buttocks support layer, 34: Cushion support portion, 34a: Contact portion, 35: Connecting member, 35a: One end, 35b: Other end, 36: Lower cushion, 37: Second buttocks support layer, 40: Backrest portion, 50: Ottoman, 50a: Surface, 50b: Ottoman, 50p: Pin member, 50u: Upper surface, 50x: Rotating shaft, 51: Handle portion, 52: Slide member, 52h: Through hole, 60: Table, 62: Storage portion, 70: Armrest, 80a: Partition, 80b: Partition, 90: Side structure, 90g: Guide member, 291: Upper portion, 291a: Projecting portion, 291t: Handle portion, CB: Cabin, CG: Center seat unit group, FL: Floor, LG: Left seat unit group, LP: Left main aisle, P: Main aisle, RG: Right seat unit group, RP: Right main aisle, SP: Space

The invention claimed is:
1. An aircraft seat unit comprising:
a seat portion including a first buttocks support layer and a second buttocks support layer; and
a backrest portion,
wherein:
the seat portion is configured to be capable of changing states between a short seat portion state and a long seat portion state, and
the first buttocks support layer configured to support a buttocks of a passenger in the short seat portion state is harder than the second buttocks support layer configured to support a buttocks of a passenger in the long seat portion state.
2. The aircraft seat unit according to claim 1, wherein: the seat portion includes:
an upper cushion that includes the first buttocks support layer; and
a lower cushion that includes the second buttocks support layer, and
the lower cushion is configured to support the upper cushion in the short seat portion state.
3. The aircraft seat unit according to claim 2, wherein: a cushion support member configured to support the upper cushion is stored below the lower cushion so as to be capable of being pulled out.
4. The aircraft seat unit according to claim 2, wherein: the upper cushion is configured to be capable of being pulled out in a forward direction.

5. The aircraft seat unit according to claim 4, wherein:
a lower portion of the upper cushion is provided with a cushion support portion configured to contact the floor of a cabin and support the upper cushion.
6. The aircraft seat unit according to claim 2, wherein: the upper cushion is configured to be deployably connected to the lower cushion.
7. The aircraft seat unit according to claim 6, wherein: the upper cushion remains in a state separated from a floor of a cabin during deployment.
8. An aircraft seat unit assembly comprising:
an aircraft seat unit as claimed in claim 7; and
a second aircraft seat unit, and
wherein:
the second aircraft seat unit includes a cushion support member configured to support the upper cushion when the upper cushion is deployed.
9. The aircraft seat unit according to claim 6, wherein: the upper cushion includes:
the first buttocks support layer; and
a second support layer located below the first buttocks support layer in the short seat portion state, and
the second support layer is softer than the first buttocks support layer.
10. The aircraft seat unit according to claim 1, further comprising:
an ottoman, and
wherein:
in the long seat portion state, an L-shaped surface is formed by a surface of the seat portion and a surface of the ottoman in a plan view.
11. The aircraft seat unit according to claim 1, further comprising:
a side structure disposed on a side of the seat portion, and
an ottoman, and
wherein:
the ottoman is stored in a lower portion of the side structure so as to be capable of being pulled out.
12. The aircraft seat unit according to claim 1, further comprising:
a side structure disposed on a side of the seat portion, and
an ottoman, and
wherein:
a position of the ottoman can be modified between a first position in front of the side structure and a second position that is to a side of the first position and in front of the seat portion.
13. The aircraft seat unit according to claim 12, wherein: the position of the ottoman can be modified from the first position to the second position by rotating the ottoman about an axis parallel to a vertical direction.
14. The aircraft seat unit according to claim 12, wherein: an angle of an upper surface of the ottoman with respect to a horizontal plane can be angularly modified from a first angle to a second angle that is greater than the first angle.
15. The aircraft seat unit according to claim 14, wherein: the backrest portion is a reclinable backrest portion.

* * * * *